(No Model.) 2 Sheets—Sheet 1.

M. A. MONTEJO.
COMBINED PARASOL AND FAN.

No. 286,626. Patented Oct. 16, 1883.

Witnesses.
John Buckler,
Albert P. Moriarty.

M. A. Montejo.
Inventor.
By Jacob J. Storer.
Attorney.

(No Model.) 2 Sheets—Sheet 2.
M. A. MONTEJO.
COMBINED PARASOL AND FAN.
No. 286,626. Patented Oct. 16, 1883.
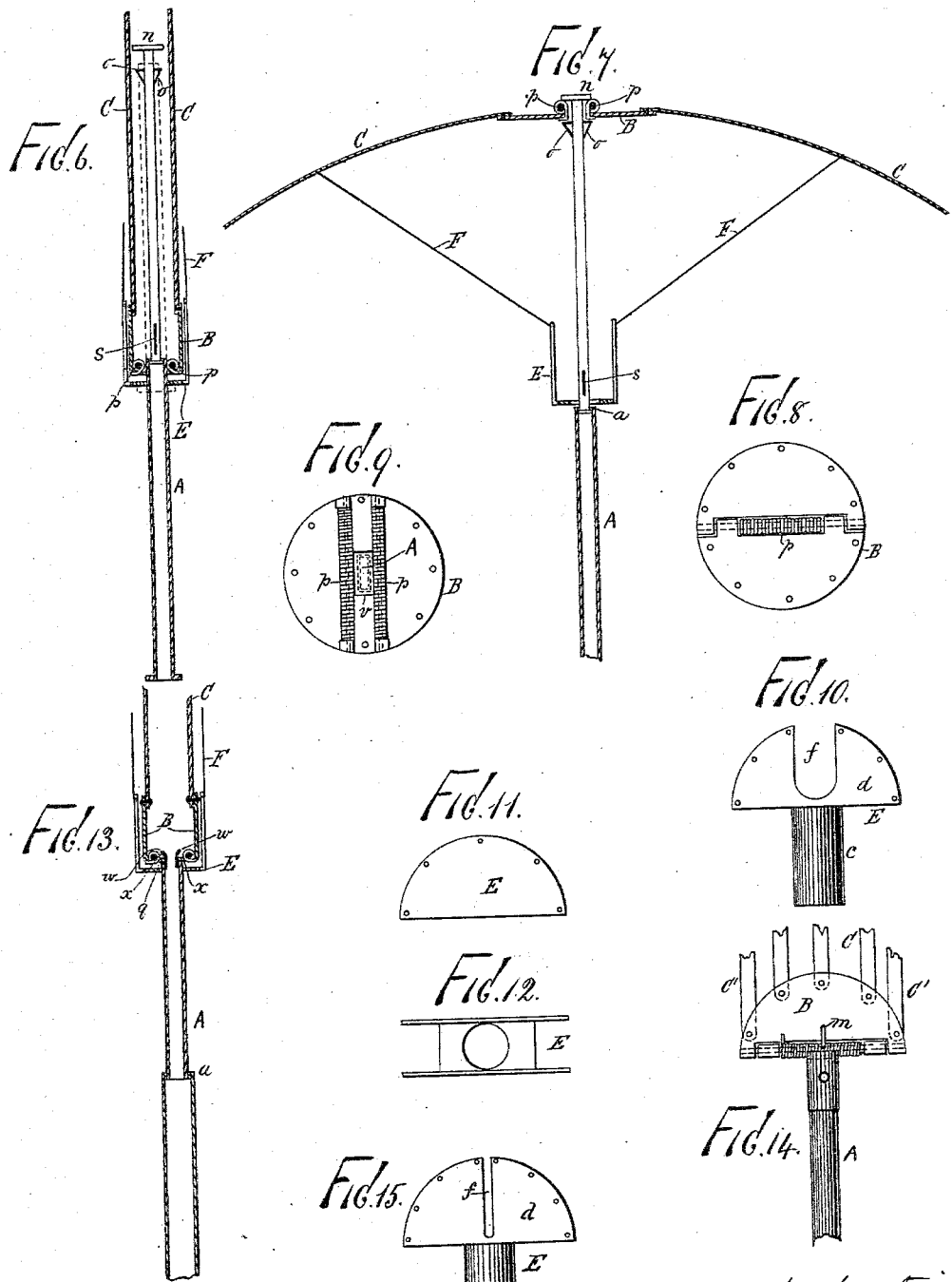

UNITED STATES PATENT OFFICE.

MIGUEL A. MONTEJO, OF NEW YORK, N. Y., ASSIGNOR OF ONE-HALF TO BENJAMIN ODIO, FELIPE PEROZO, AND BERNARDO C. HECHAVARRIA, ALL OF SAME PLACE.

COMBINED PARASOL AND FAN.

SPECIFICATION forming part of Letters Patent No. 286,626, dated October 16, 1883.

Application filed November 23, 1882. (No model.)

*To all whom it may concern:*

Be it known that I, MIGUEL ANTONIO MONTEJO, a citizen of the United States of North America, and a resident of the city, county, and State of New York, have invented a new and useful Improvement in a Combined Parasol and Fan, of which the following is a specification.

This invention relates to a device adapted and arranged to be used either as a parasol or a fan, convertible at will from one to the other; and it consists, essentially, of a circular ribbed frame constructed in two like sections hinged together, so that it can be folded in the shape of an open or closed fan, and be spread open to form a parasol of the usual shape; and it further consists of novel devices for attaching the frame to the handle and for adjusting the device at pleasure to be used as a parasol or fan, one of the special features consisting of flexible stretchers and another of pivoted ribs.

Reference is to be had to the accompanying drawings, forming part of this specification, in which similar letters of reference indicate corresponding parts in all the figures.

Figure 1:
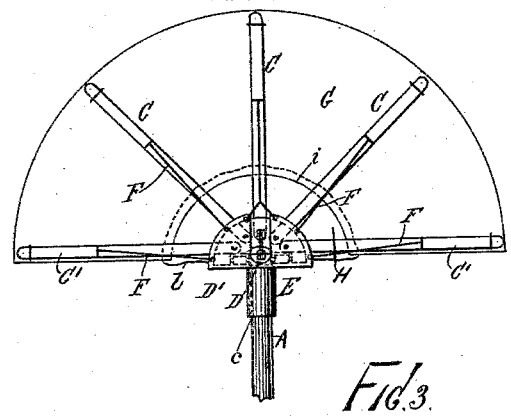
Figure 2:
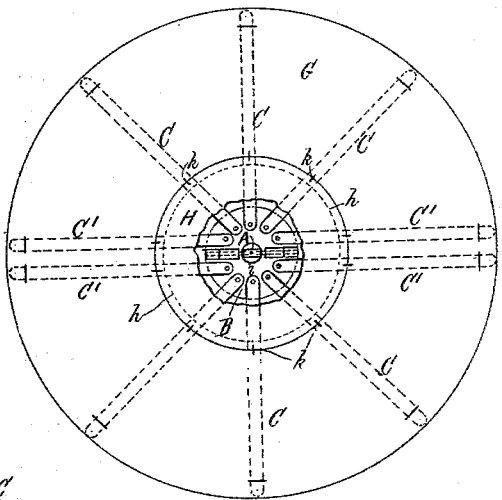
Figure 3:
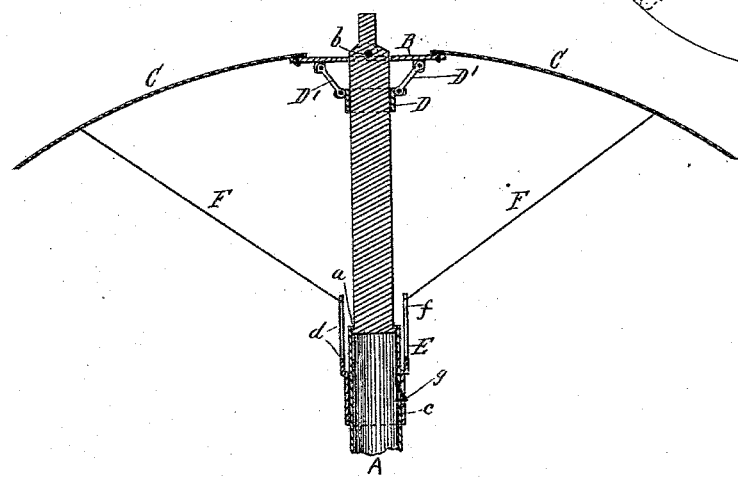
Figure 4:
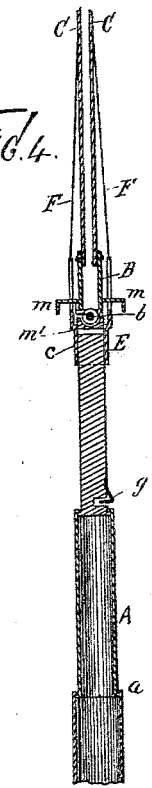
Figure 5:
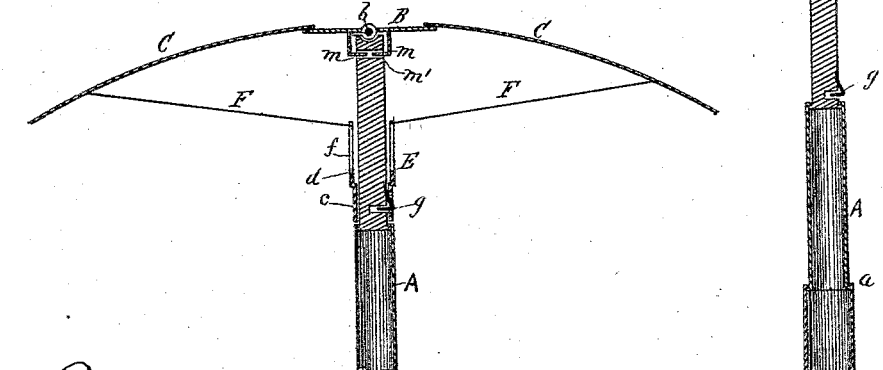

Figure 1 represents an elevation of the device when used as an open fan. Fig. 2 is a plan of the device with parts broken away to exhibit other parts when spread open as a parasol. Fig. 3 is an enlarged sectional elevation of the frame of the device open as a parasol. Fig. 4 is an enlarged sectional edge elevation of the frame of the device closed as a fan, and showing a modification of the devices employed for securing the frame to the handle and for holding it open to serve as a parasol. Fig. 5 is a sectional elevation of the same open as a parasol. Fig. 6 is a sectional edge elevation of the frame of the device closed as a fan, showing another modification of the devices for holding the handle to the frame, as well as a modification of the handle. Fig. 7 is a sectional elevation of the modification shown in Fig. 6 with the device open as a parasol. Fig. 8 is an enlarged plan view of the hinged rib-plate shown in Figs. 1, 2, and 3. Fig. 9 is an enlarged plan view of the hinged rib-plate shown in Figs. 6 and 7. Fig. 10 is an enlarged elevation of the runner shown in Figs. 1, 3, and 5. Fig. 11 is an enlarged elevation of the runner shown in Figs. 6, 7, and 12. Fig. 12 is a plan of the runner shown in Fig. 11. Fig. 13 is a sectional elevation of a modification of the device, showing another way of attaching the handle. Fig. 14 is an enlarged front elevation of the rib-plate and handle shown in Figs. 4 and 5. Fig. 15 is a front elevation of the runner shown in Figs. 4 and 5.

The handle A of the device is made of any suitable material, the parts thereof being preferably arranged to slide or telescope on each other, as indicated at *a*. The rib-plate B is formed of two segments hinged together on a rod, *b*, that is passed at right angles through the top of the rod A. The ribs C C' are pivoted to this plate B by vertical pivots, so that they can be folded together laterally, as in a closed fan, and radiate therefrom, as shown, and yet be supported by the plate in a substantially horizontal position.

D is a thimble or collar movable on the handle A, and D' are links or rods hinged at their upper ends to the segments of the plate B and at their lower ends to the thimble D, so that when said thimble D is drawn down, as shown in Fig. 3, the plate B is thereby opened flat, with the ribs C C' extended, as shown in Figs. 2 and 3.

E represents a runner movable on the handle A, having a tubular portion, *c*, somewhat closely fitting about said handle, and formed on the top of said tubular portion *c* a double segmental flange, *d*, having a vertical slot, *f*, in each segment, said flanged portion of the runner E being designed to embrace or cover the rib-plate B when the device is closed as a fan, as shown in Fig. 1.

To the upper circular edges of this runner E are attached the stretchers F, that extend from the ribs C C'. These stretchers F are flexible, being constructed of cord, wire, or chain, and may, if desirable, be made of elastic cord. They permit the easy conversion of the device into a fan or parasol, remaining always extended at length.

To open the device for use as a parasol, the thimble D is drawn down, as shown in Fig. 3, to open and extend the rib-plate B and ribs C C', and then the runner E is drawn down, with the effect of causing the stretchers F to curve the said ribs C C' downward, as shown in Fig.

3, said runner E being held down in place by a spring, g.

When the device is to be used as a fan, the spring g is pushed in to release the runner E, which is then moved up against and over the plate B, the slots f permitting the former to pass over the links D', and thereby the said plate B and ribs C C' are folded up with the stretchers F remaining drawn taut, as shown in Fig. 1.

G represents a suitable annular covering of silk, cambric, or other material, secured to the ribs C C', and extending from the outer tips thereof inward only to point h, thereby leaving a circular central opening, i, for ventilation, over which extends a cap or cowl, H, of like material, which is secured to the ribs C C' by stitches k, and centrally to the umbrella-handle.

It will be observed that the ribs C' are attached to each side of the segments of the plate B, near the edge thereof, and are extended parallel with each other, as shown in Figs. 1 and 2, to form the straight lower edge of the device when used as a fan, as seen in Fig. 1.

When the device is folded up as a fan, the cowl or cap H hangs down, as shown at l, Fig. 1, and when the device is used as a parasol said cowl H is extended, as shown in Fig. 2, covering the opening i to exclude sun and rain, and so that air passing up may escape through the opening i, and between the covering G and cowl H at the points where the latter is not attached to the former.

When used as a fan, the device may be folded laterally, a cord attached in the usual manner, being, if desired, used for such purpose.

In Figs. 4, 5, and 14 is shown a modification of the device wherein the single hinged rib-plate B has projecting from each segment a pin, m, bent at right angles, while in the opposite sides of the handle A are corresponding sockets, m', so that when the device is opened or spread for use as a parasol the free ends of said pins m will enter the sockets m' and hold it in that position, as shown in Fig. 5. At the same time the runner E (shown in Fig. 15) will be drawn down and held by the spring g, as shown in Fig. 5. When folded up, as shown in Fig. 4, the runner E covers the rib-plate B, the narrow vertical slots in the former permitting it to pass up over the pins m. The rib-plate B in this instance, as shown in Fig. 8, is provided along the hinge-pintle with a spiral spring, p, that assists in closing the said plate up when the device is to be used as a fan.

In Figs. 6 and 7 another modification of the device is seen, wherein the telescoping handle A is preferably of rectangular cross-section, as indicated in Fig. 9, the lower section thereof being designed to slide up over the upper section, and to remain in the position indicated in dotted lines, Fig. 6, when the device is used as a fan. In this instance the upper handle-section has fixed on its upper extremity a button, n, that is designed to prevent it from being drawn downward through the rib-plate B, and is also provided with opposite thumb-springs, o, that engage against the lower face of said plate B and hold it up in position when the device is open as a parasol, and that can be depressed to permit the downward movement of the said plate B when the device is to be used as a fan, as shown in Fig. 6. The rib-plate B, in this instance, is composed of a central metallic strip having a central handle-opening, v, and having opposite semicircular flanges hinged thereto, and provided with springs p p, that assist in closing said flanges upward, as shown in Fig. 6, when the device is used as a fan. The runner E, in this instance, (shown also in Figs. 11 and 12,) is fashioned to cover the plate B when the device is used as a fan. In the upper section of the handle A, as shown in Figs. 6 and 7, is a thumb-spring, s, that, when out in its normal position, prevents the telescoping of the handle, but permits it when pushed in. When this device so modified is used as a fan, the handle will be closed up between the frame or cover segments, as indicated in Fig. 6.

In Fig. 13 is shown still another modification of the device, in which the upper extremity of the handle A is provided with opposite curved springs, w, that, when the handle is applied in the opening q of the plate B, engage against and over the edges of the same, and thereby hold the parts connected, shoulders x on said handle A preventing it from being inserted too far through or into the opening q. In this instance the handle may be entirely detached from the other portion of the device and be telescoped and carried in the pocket, while the other portion may be used as a fan. The runner and rib-plate used in this instance are the same as those shown in Figs. 6, 7, 9, 11, and 12.

When constructed and arranged as above described, my improved combined parasol and fan will be found admirably adapted to the uses and purposes for which it is intended, as it may quickly be changed from one to the other, as occasion may require.

I do not herein claim any of the modifications herein shown and described, as it is my purpose to make them the subjects of other applications for patents.

Having thus described my invention, I claim as new and desire to secure by Letters Patent—

1. A combined parasol and fan, constructed with a frame formed of two sections hinged together, and provided with a spring to close them up in the shape of a fan and stretchers to hold them in the shape of an umbrella, substantially as described.

2. In a combined parasol and fan, the combination, with a rib-plate constructed in two like sections hinged to each other, of ribs connected thereto by pivots and radiating therefrom, substantially as herein shown and described.

3. The combination, with the sectional hinged rib-plate B, of the spring p, substantially as herein shown and described, said spring serving to close up said plate, as set forth.

4. In a combined parasol and fan, the combination, with the ribs and runner, of flexible stretchers connecting the same, substantially as and for the purposes set forth.

5. In a combined parasol and fan of the character herein specified, the combination, with the handle and rib-plate, of a thimble or collar and connecting-links, substantially as herein shown and described, whereby the said plate may be opened or closed, as set forth.

6. In a combined parasol and fan of the character herein specified, the combination, with the handle, frame, and stretchers, of a runner having vertical semicircular flanges, substantially as herein shown and described.

7. In a combined parasol and fan of the character herein specified, the combination, with the hinged rib-plate B and pivoted ribs C, of the parallel ribs C', substantially as herein shown and described, said ribs C' being designed to form the lower straight edge of the device when used as a fan, as set forth.

In testimony that I claim the foregoing as my invention I have signed my name, in presence of two witnesses, this 13th day of October, 1882.

MIGUEL ANTONIO MONTEJO.

Witnesses:
JACOB J. STORER,
ALBERT P. MORIARTY.